March 7, 1939.  J. K. SMITH  2,149,796
PAPER HOLDER
Filed June 13, 1938
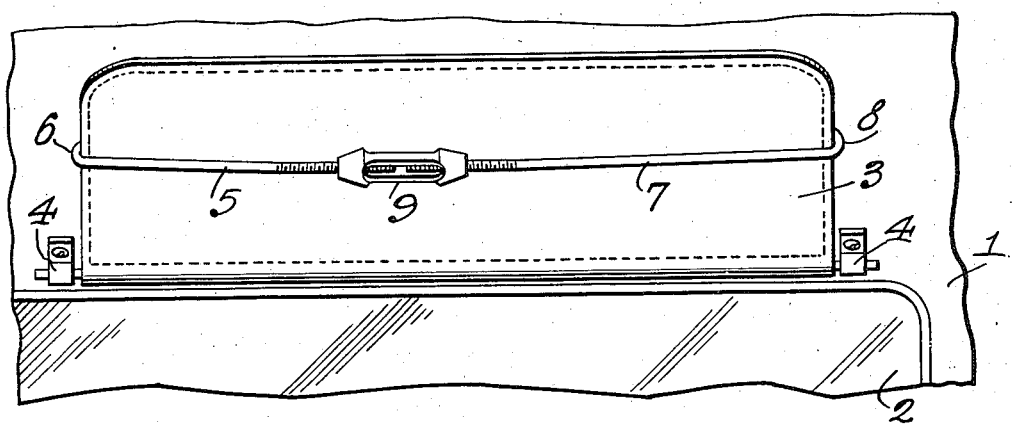
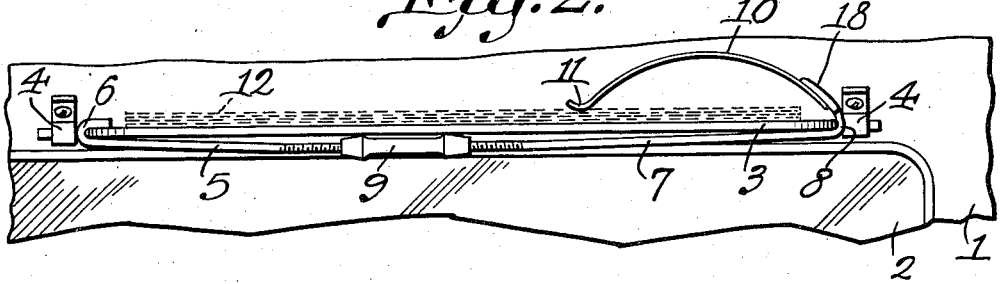
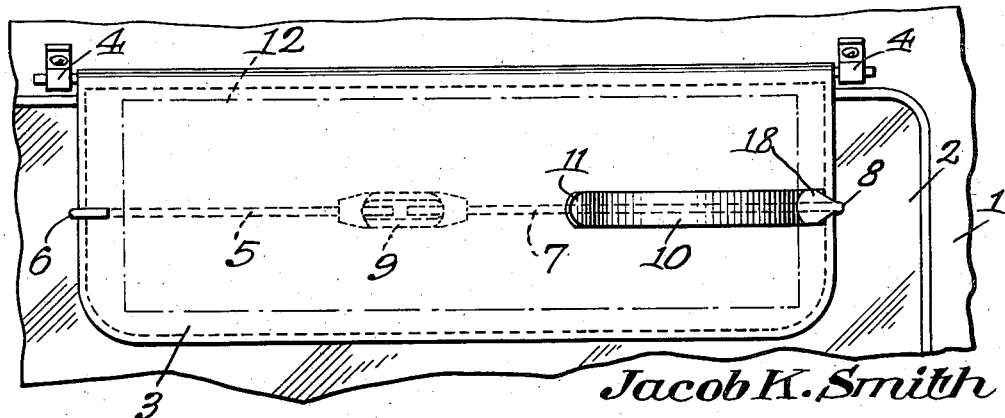
Jacob K. Smith
INVENTOR.
BY
ATTORNEYS.

Patented Mar. 7, 1939

2,149,796

UNITED STATES PATENT OFFICE 2,149,796

PAPER HOLDER

Jacob K. Smith, North Baltimore, Ohio

Application June 13, 1938, Serial No. 213,560

3 Claims. (Cl. 40—11)

Persons making a business trip in an automobile often have small account books, bills and the like, hereinafter referred to as "papers", which must be carried conveniently, accessibly, and if desired, out of sight. This invention aims to provide a simple but effective means whereby papers may be mounted releasably on the sun shade of an automobile.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 is an elevation which shows, raised to an inoperative position, an automobile sun shade whereunto a device constructed in accordance with the invention has been applied;

Fig. 2 is a similar view, in which the shade has been swung down toward an operative position, and;

Fig. 3 is an elevation wherein the shade has been swung down to an operative position.

The numeral 1 indicates any part of an automobile, the part 1 being provided with a window 2. The window 2 may be the windshield, or it may be a pane in a door. The numeral 3 marks a sun shade. At 4 there is shown any desired means for mounting the sun shade 3, so that the sun shade may be moved toward and from the window 2, in a well known manner.

The device forming the subject matter of this application preferably is made of metal throughout. It comprises a body which may be shortened or lengthened at the will of an operator. The body preferably includes straight rods 5 and 7 connected at their inner ends by a turn buckle 9. There is a rigid hook 6 at the outer end of the rod 5, and a rigid hook 8 at the outer end of the rod 7.

A curved spring tongue 10 is provided and has its outer end secured to a broadened bill 18 forming part of the hook 8. The spring tongue 10 has a curved finger 11 at its inner end.

The shade-engaging elements or hooks 6 and 8 are caused to grip opposite edges of the shade 3 by rotating the turn buckle 9 and shortening the body of the article. The papers 12 can be used or consulted and be slipped readily under the inner end of the tongue 10, owing to the curve of the finger 11, and the papers will be held on the sun shade.

The papers 12 preferably are held on the upper surface of the sun shade when the sun shade is in the inoperative position of Fig. 1, and, therefore, the papers are out of sight. The operator can swing down the sun shade 3 on the means shown at 4, to the position of Fig. 3, and consult or take out any of the papers 12 that he wishes to use. Of course, if the operator desires to fasten the papers 12 on the lower surface of the sun shade 3, he simply reverses the position of the paper holder from that shown in the drawing. The papers 12 then will be visible at all times.

Because the hooks 6 and 8 are rigid, the papers 12 can be pulled out from beneath the free finger 11 of the tongue or paper retaining means 10 without disturbing the hold of the hooks 6 and 8 on the edges of the sun shade 3. The tongue 10 is attached at its outer end to the bill 18 of the hook 8 and projects in the general direction of the hook 6. Specifically, the tongue 10 extends lengthwise of the body rod 7.

The device is simple in construction, but will be found thoroughly effective for the purposes in view and hereinbefore set forth.

What is claimed is:

1. A paper-holder for the sun shade of a vehicle, comprising rods having hooks at their outer ends, a turn buckle connecting the inner ends of the rods, and a resilient paper-holding tongue carried at one end by one hook and projecting in the general direction of the other hook.

2. A paper holder for the sun shade of a vehicle, comprising rods having rigid hooks at their outer ends, a turn buckle connecting the inner ends of the rods, and a resilient paper-holding tongue carried at one end by one of the rigid hooks and projecting in the general direction of the other hook, the tongue being concaved away from the rod having the hook whereon the tongue is carried.

3. A paper-holder for the sun shade of a vehicle, comprising rods having hooks at their outer ends, a shortening and lengthening connection uniting the inner ends of the rods, and a resilient paper-holding tongue carried at one end by one hook and projecting in the general direction of the other hook.

JACOB K. SMITH.